(12) United States Patent
Henneke (10) Patent No.: US 11,187,918 B2
(45) Date of Patent: Nov. 30, 2021

(54) SYSTEMS AND METHODS ASSOCIATED WITH GLASSES

(71) Applicant: Carl Henneke, Kerrville, TX (US)

(72) Inventor: Carl Henneke, Kerrville, TX (US)

( * ) Notice: Subject to any disclaimer, the term of this patent is extended or adjusted under 35 U.S.C. 154(b) by 120 days.

(21) Appl. No.: 16/399,584

(22) Filed: Apr. 30, 2019

(65) Prior Publication Data

US 2019/0377196 A1    Dec. 12, 2019

Related U.S. Application Data

(60) Provisional application No. 62/683,062, filed on Jun. 11, 2018, provisional application No. 62/692,201, filed on Jun. 29, 2018.

(51) Int. Cl.
*G02C 5/14* (2006.01)
*G02C 5/22* (2006.01)

(52) U.S. Cl.
CPC .............. *G02C 5/146* (2013.01); *G02C 5/143* (2013.01); *G02C 5/22* (2013.01)

(58) Field of Classification Search
CPC ... G02C 5/14; G02C 5/16; G02C 5/20; G02C 5/22; G02C 5/143; G02C 5/146; G02C 5/2209; G02C 5/2272; G02C 11/00; G02C 11/02; G02C 11/04; G02C 11/10; G02C 2200/16; G02C 2200/02; G02C 2200/10

USPC ........ 351/111–115, 119, 121, 123, 140, 141, 351/153, 158
See application file for complete search history.

(56) References Cited

U.S. PATENT DOCUMENTS

| | | |
|---|---|---|
| 4,006,974 A | 2/1977 | Resnick |
| 4,375,911 A | 3/1983 | Bononi |
| 5,016,999 A | 5/1991 | Williams |
| 5,956,117 A | 9/1999 | Suh et al. |
| 6,530,659 B1 | 3/2003 | Marcum |
| 7,314,218 B2 | 1/2008 | Resler et al. |
| 8,167,426 B2 | 5/2012 | Lampru |
| 8,460,488 B2 | 6/2013 | Chauvin |
| 2002/0003604 A1* | 1/2002 | Yaguchi ............. G02C 5/143 351/122 |
| 2005/0237624 A1 | 10/2005 | Foldes |
| 2006/0070161 A1 | 4/2006 | Bleau |
| 2009/0135370 A1* | 5/2009 | Xiao ............. G02C 5/20 351/140 |
| 2015/0020814 A1 | 1/2015 | Flatau |
| 2015/0150326 A1 | 6/2015 | Gains |

\* cited by examiner

*Primary Examiner* — Jie Lei
(74) *Attorney, Agent, or Firm* — Pierson Intellectual Property LLC (57) ABSTRACT

Examples of the present disclosure are related to systems and methods associated with glasses. More specifically, embodiments are related to glasses with separable arms with a triangular shaped support, wherein a first portion of an arm is separable from a second portion of the arm at a location that substantially aligns with a user's temple.

11 Claims, 9 Drawing Sheets

SYSTEMS AND METHODS ASSOCIATED WITH GLASSES

BACKGROUND INFORMATION

Field of the Disclosure

Examples of the present disclosure are related to systems and methods associated with glasses. More specifically, embodiments are related to glasses with separable arms with a triangular shaped support, wherein a first portion of an arm is separable from a second portion of the arm at a location that substantially aligns with a user's temple.

Background

Glasses are devices consisting of glass or hard plastic lenses mounted in a frame that holds the lenses in front of a user's eyes. The frame typically includes a pair of arms that secures the glasses over the ears of the user. Glasses wearers may use a strap to prevent the glasses from falling off during movement or sports.

However, uncomfortable situations may occur when a user attempts to lie down while wearing glasses. This causes pressure applied to the arms of the glasses to be translated to the user's temple. Alternatively, the ends of the arms may poke the user. In other situations, the strap may cause discomfort to the user if the strap is too tight. If the strap is too loose, the strap on conventional glasses may not operate effectively.

Accordingly, needs exist for systems and methods for glasses with separable arms with a bendable hinge.

SUMMARY

Embodiments described herein glasses with separable arms with a triangular shaped support, wherein a first portion of an arm is separable from a second portion of the arm at a location that substantially aligns with a user's temple, wherein the second portion of the arm includes a bendable, dynamic hinge.

Embodiments may include a first portion of an arm, second portion of the arm, adjustable member, coupling mechanism, and compressible support.

The arm of the frame of the glasses may extend from a first end that is positioned proximate to a hinge point of the frame to a second end that is positioned on a distal end of the frame. The arm of the glasses may be configured to be positioned over a user's ears, and secure the frame to the user's head.

The first portion of the arm may extend from the hinge point towards a distal end of the arm. The second portion of the arm may extend from the distal end of the arm towards the hinge point of the arm. The first portion of the arm and the second portion of the arm may be permanently coupled together via the adjustable member, and selectively coupled together via a coupling mechanism.

The adjustable member may be a retractable, telescopic, extendable, folding, collapsible element, such as a retractable reel. The adjustable member is configured to have a first end coupled within the first portion of the arm, and a second portion coupled within a second portion of the arm. The adjustable member may be configured to permanently tether the first portion of the arm with the second portion of the arm. A length of the adjustable member may be configured to dynamically change based on forces applied to the first portion of the arm and/or the second portion of the arm. In embodiments, responsive to the first portion of the arm being positioned adjacent to the second portion of the arm, the adjustable member may have a first length. Responsive to the first portion of the arm being positioned away from the second portion of the arm, the adjustable member may be elongated having a second length. By changing the length of the adjustable member from the first length to the second length, the first portions of the arm may be positioned away from the second portion of the arm. In embodiments, the adjustable member may change between the first length and second length based on forces applied to either portion of the arm. For example, responsive to pulling on the second portion in a first direction, away from the hinge, the adjustable member may change from the first length to the second length. Responsive to no longer pulling on the second portion, the adjustable member may retract from the second length to the first length. In further embodiments, in a resting state, the adjustable member may have the first length.

The coupling mechanism may an internal coupling mechanism with a male or female member positioned on an inner end of the first portion of the arm, and a reciprocal member positioned on an inner end of the second portion of the arm. The male member of the coupling mechanism may be configured to be inserted into the female member to temporarily couple the first portion of the arm with the second portion of the arm. Responsive to a force being applied to the coupling mechanism being greater than a coupling threshold, the male and female member may detach from each other, which may also simultaneously cause the adjustable member to incrementally elongate. In embodiments, the coupling mechanism may be a press fit coupling mechanism, magnetic based, and/or a combination. For example, a recess in the female member may have a first magnetic polarity which may interact with a projection on the male member to magnetically secure the coupling mechanism together. In embodiments, the coupling mechanism may have angled, slanted, etc. inner sidewalls that are configured to increase the surface area of the magnetic forces between the male and female member. The angling may slant downward towards a center of the frame, such that if the male and female members are detached, the first and second portions of the arm may create an outwardly convex bend away from the users face.

The compressible member may be positioned on the second portion of the arm. The compressible member may be comprised of a semi-rigid material, such as foam. The compressible member is configured to compress and return to its original form. The compressible member may be substantially triangular in shape with a larger width proximate to the inner end of the second arm than at an outer end of the second arm. The compressible member may be configured to assist in securing the frame of the glasses to a user's head at a location between the coupling mechanisms and the ear of the user. In embodiments, the tapering of the width of the compressible member may extend from a position proximal to the coupling mechanism to a position proximal to a midway point of the second portion of the arm.

The dynamic hinge may be positioned on the second portion of the arm. The dynamic hinge may be configured to flex, bend, etc. based on forces applied to a distal end of the arm. Responsive to the forces being applied to the distal end of the arm, the dynamic hinge may flex. In embodiments, the dynamic hinge may be configured to flex whether the adjustable member has the first length or the second length.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Figure 1:
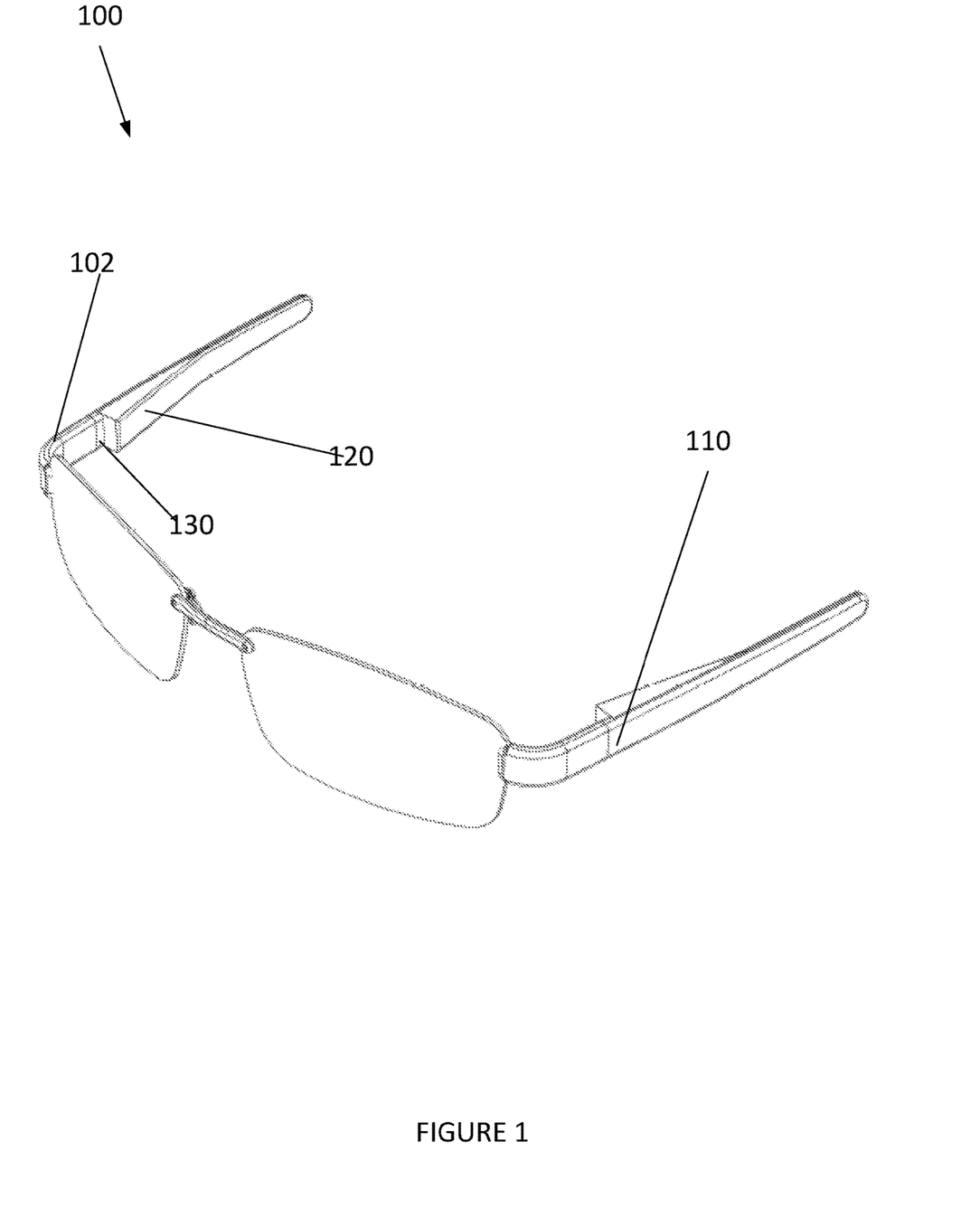
FIG. 1 depicts glasses, according to an embodiment.

FIG. 1 depicts glasses 100, according to an embodiment. Glasses 100 are configured to be worn on the head of the user. Responsive to forces applied against the arms 110 of glasses 100, a first portion of an arm 110 may be separable from a second portion of the arm 110. This may alleviate discomfort applied to the user's head. Glasses 100 may include arms 110, compressible member 120, and coupling mechanism 130.

Arm 110 may extend from a first end that is positioned proximate to a hinge 102 point of the frame to a second end that is positioned on a distal end of the frame. Arm 110 of glasses 100 may be configured to be positioned over a user's ears, and secure the frame to the user's head. In embodiments, glasses 100 may include two arms 110, positioned on both sides of the frame.

Compressible member 120 may be positioned on a second portion of the arm 110. Compressible member 120 may be comprised of a semi-rigid material, such as foam. Compressible member 120 may be configured to compress and return to its original elongated form in a resting state. Compressible member 120 may be substantially triangular in shape with a larger width proximate to the inner end of the second portion of arm 110 than at an outer end of the second portion of the arm 110. This may enable compressible member 120 to apply a securing force against a user's temple. As such, compressible member 120 may be configured to assist in securing the frame of the glasses to a user's head at a location between the coupling mechanisms and the ear of the user. The tapering of the width of compressible member 120 may extend from a position proximal to the coupling mechanism 130 to a position proximal to a midway point of the second portion of the arm 110. In embodiments, responsive to a user positioning arm 110 around their head, compressible member 120 may compress in width. Responsive to removing arm 110 from their head, compressible member 120 may elongate to be substantially triangular in shape. In embodiments, an inner surface of compressible member 120 may be layered with textured foam to more efficiently secure glasses 100 to a user's face.

Coupling mechanism 130 may be an internal coupling mechanism with a male or female member positioned on a first inner surface of the first portion of the arm 110, and a reciprocal member positioned on a second inner surface of the second portion of the arm 110. The male member of the coupling mechanism 130 may be configured to be inserted into the female member to temporarily couple the first portion of the arm with the second portion of the arm 110, wherein the female member and male members may apply frictional, magnetic, or other forces against each other. Responsive to a force being applied to the coupling mechanism 130 being greater than a coupling threshold, the male and female member may detach from each other. Coupling mechanism 130 may be a press fit coupling mechanism, magnetic based, and/or a combination. In embodiments, coupling mechanism 130 may have slanted, angled, etc. internal sidewalls, this may configured to increase a magnetic surface area between the inner sidewalls of coupling mechanism 130.

Figure 2:
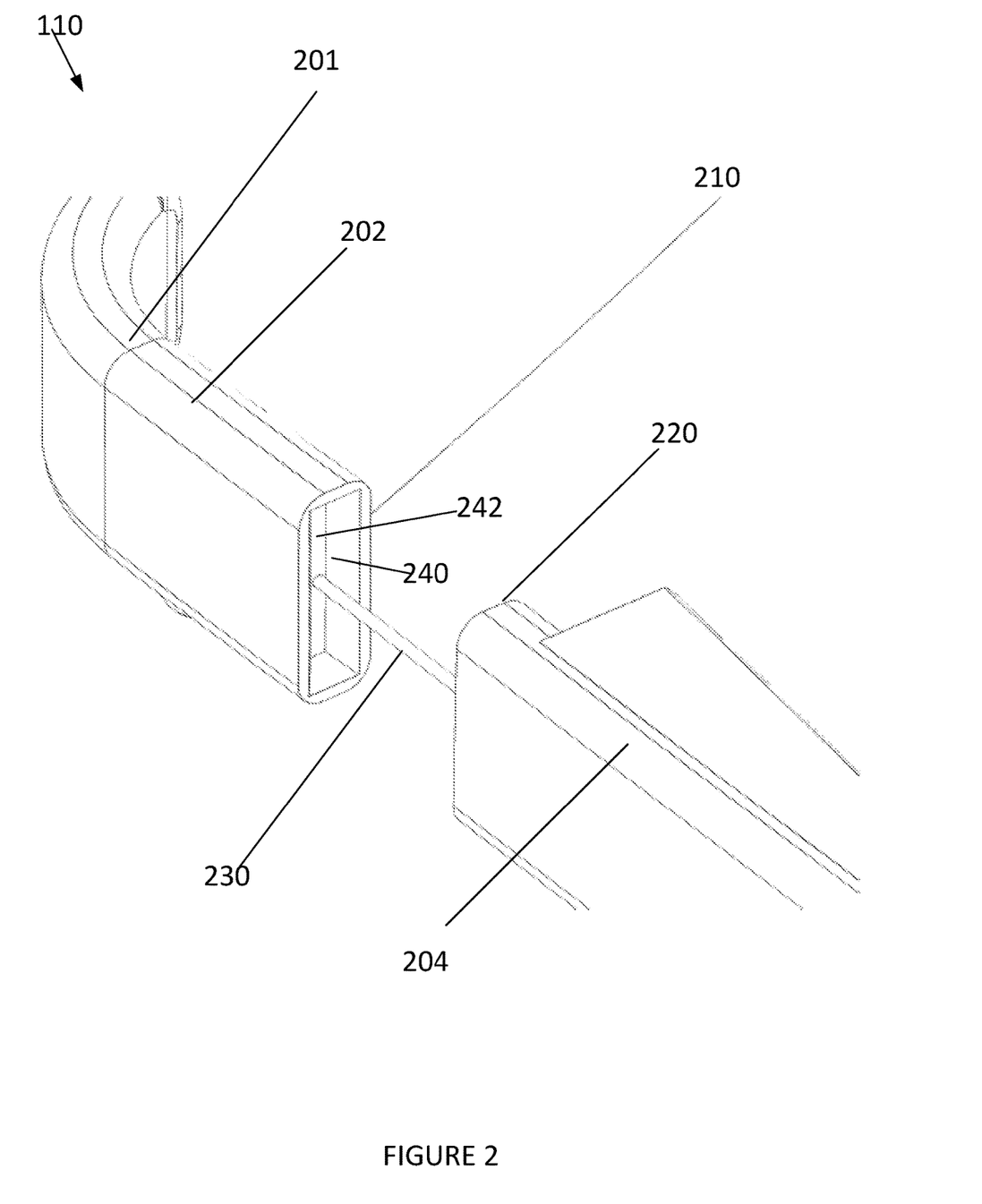
FIGS. 2 and 3 depict an arm in a second mode, according to an embodiment.
Figure 3:
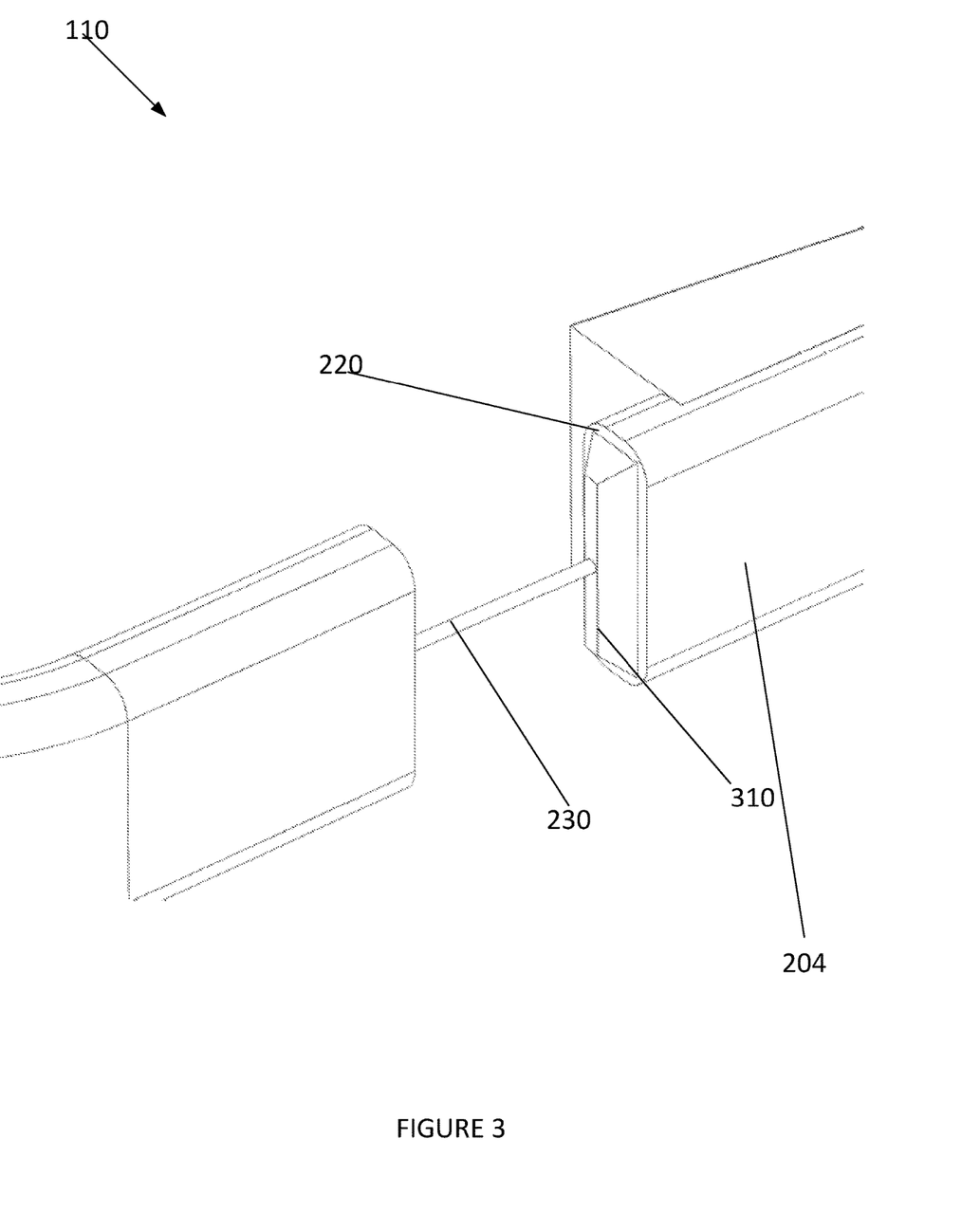

FIGS. 2 and 3 depicts arm 110 in a second mode, according to an embodiment. As depicted in FIG. 2, arm 110 may be partitioned into a first portion 202 and a second portion 204.

First portion 202 may be configured to extend from a hinge point 201 of arm 110 towards a first face 210 of coupling mechanism 130. First portion 202 may be sized to position first face 210 substantially in line with the user's temple.

Second portion 204 may be configured to extend from a second face 220 of coupling mechanism 130 to a distal end of arm 110. Second portion 204 may have a length that is greater than first portion 202.

An inner face 210 of first portion 202 and an inner face 220 of second portion 204 may be configured to be positioned adjacent to one another in a first mode. In a second mode, first portion 202 and second portion 204 may be configured to be spaced apart from one another. While in the second mode, forces applied across the arm 110 may be transferred to first portion 202 and second portion 204, which may limit the amount of pressure applied by arm 110 against a user's head. While in use, when forces applied across arm 110 are greater than a coupling threshold, arm 110 may bend inward causing glasses 100 to transition from the first mode to the second mode.

Adjustable member 230 may be a retractable reel, tether, strap, string, etc. that is configured to couple elongate and compress. Adjustable member 230 may be configured to permanently couple first portion 202 and second portion 204 at a location that is proximate to a temple of a user. In embodiments, adjustable member 230 may be comprised of a stretchable material that is configured to be housed within a first portion 202 in the first mode, and exposed in the second mode. Responsive glasses 100 transitioning from the first mode to the second mode, an exposed portion of adjustable member 230 that is not positioned within arm 110 may expand, grow, etc. to allow second portion 204 to not be positioned adjacent to first portion 202. In further embodiments, adjustable member 230 may be a retractable reel with a spindle positioned within either first portion 202 or second portion 204. When transitioning from the first mode to the second mode, the spindle may rotate in a first direction allowing adjustable member 230 to grow. When transitioning from the second mode to the first mode, the spindle may rotate in a second direction allowing adjustable member 230 to contract in size. As such, the amount of adjustable member 230 that is exposed from within arm 110 may dynamically change.

As depicted in FIG. 2, first portion 202 may have a female member 240 that is substantially rectangular shaped groove which occupies a first volume. Female member 240 may be configured to receive adjustable member 230 and a male member positioned on second portion 204 in the first mode. In embodiments, sidewalls 242 of female member 240 may be magnetized with a first polarity and the sidewalls of male member 230 may be magnetized with a second polarity, which may be configured to further secure first portion 202 and second portion 204 together in the first mode. As such, in the first mode, the magnetized portions of female member 240 and male member 230 may not be exposed from within the cavity of female member 240.

As depicted in FIG. 3, second portion 204 may include a male member 310. Male member 310 may be configured to extend away from a body of second portion 204, wherein male member 310 may be configured to be inserted into female member 240 in the first mode. Male member 310 may be magnetized with a second polarity, which may be configured to further secure first portion 202 and second portion 204 together in the first mode. In embodiments, male member 310 may be substantially trapezoidal shaped projection that occupies a second volume. By having male member 310 occupy a second volume that is less than the first volume, both male member 310 and adjustable member 230 may be positioned within female member 240 in the first mode.

Figure 4:
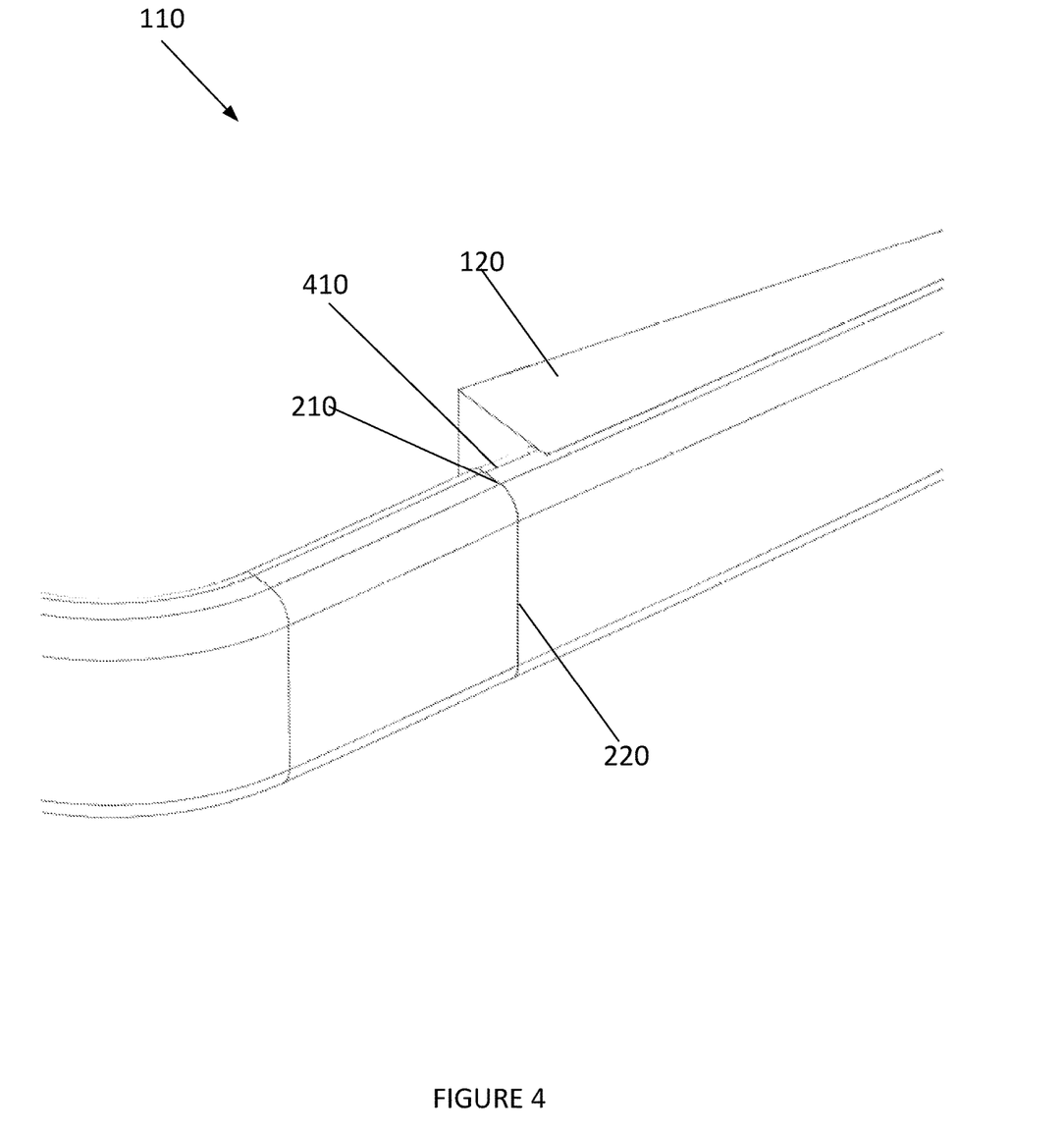
FIG. 4 depicts an arm in a first mode, according to an embodiment.
Figure 5:
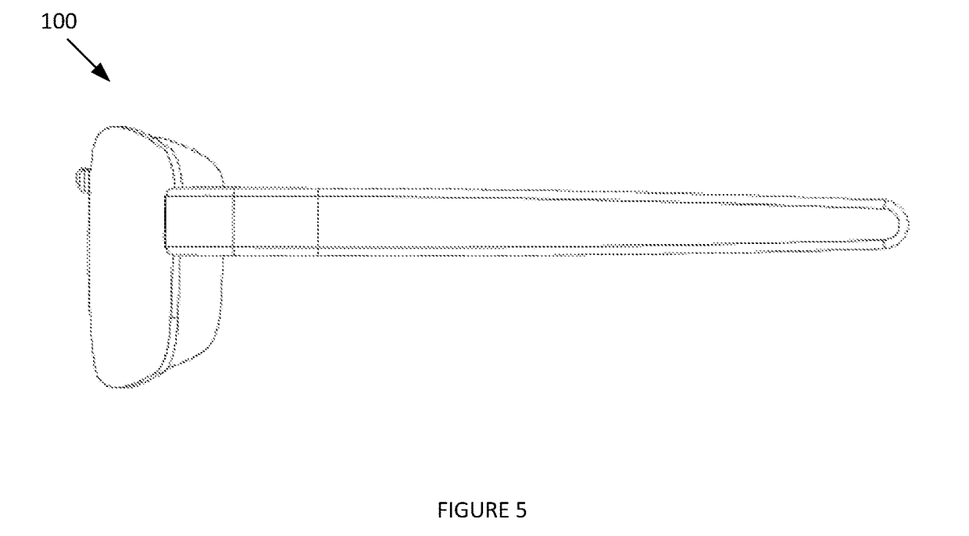
FIGS. 5-10 depict various views of glasses in the first mode, according to an embodiment.
Figure 6:
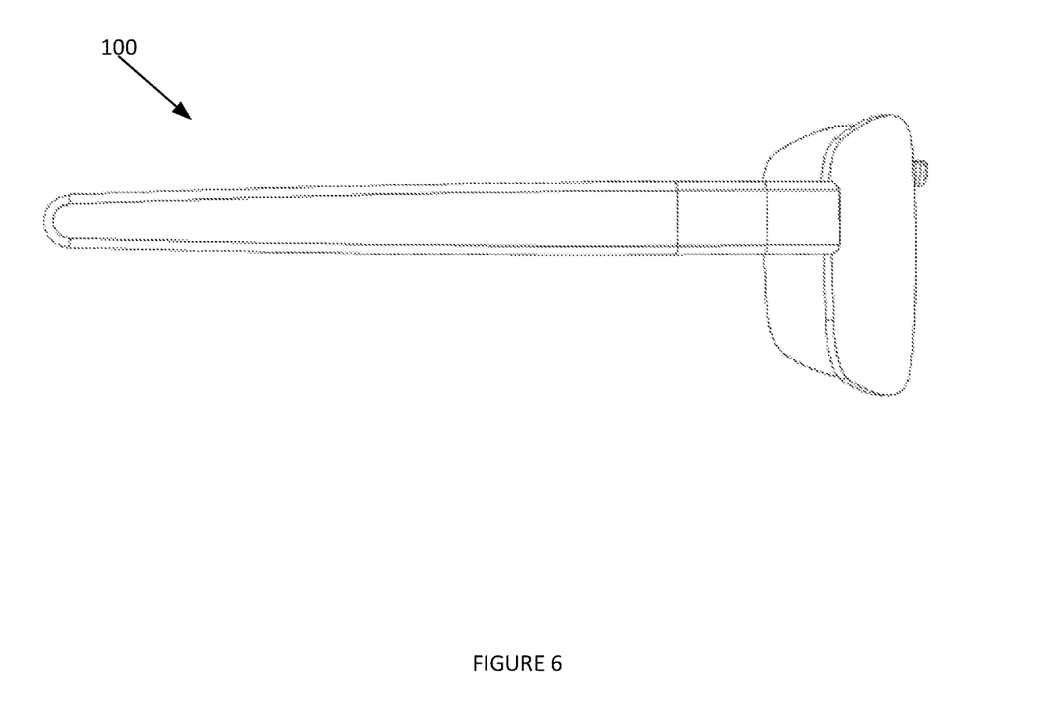
Figure 7:
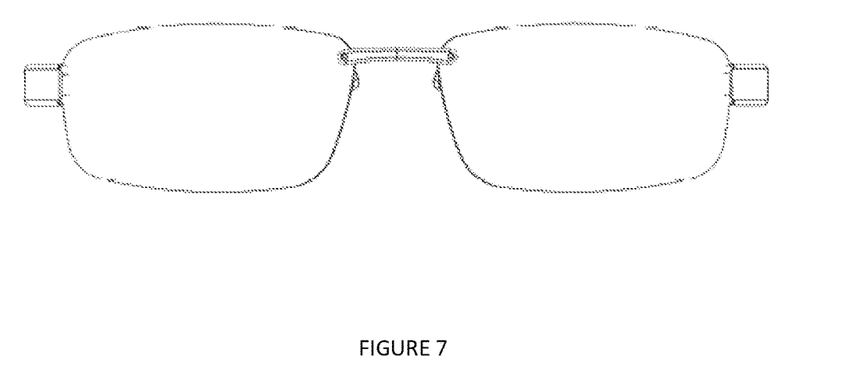
Figure 8:
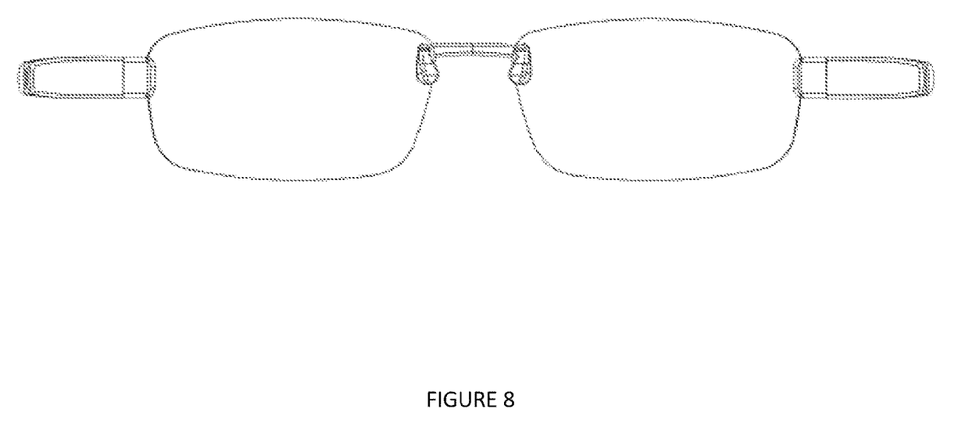
Figure 9:
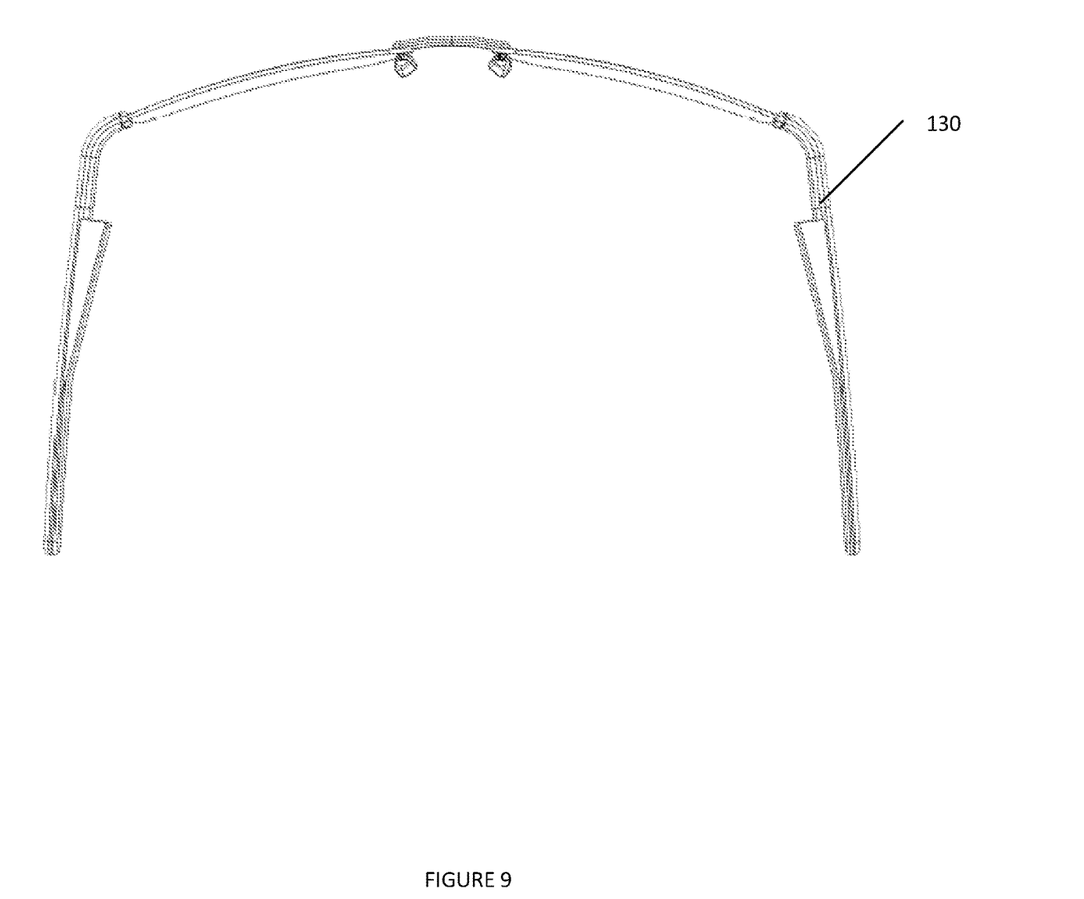
Figure 10:
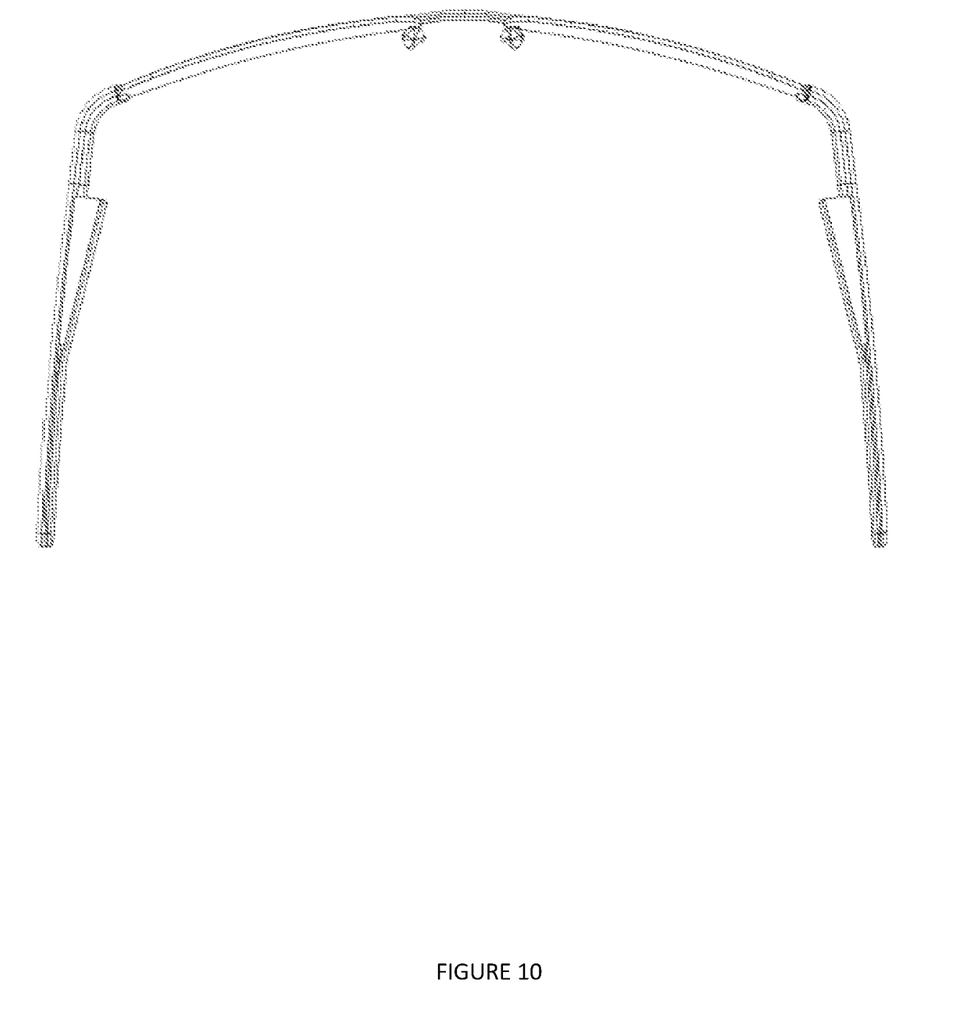

FIG. 4 depicts arm 110 in a first mode, according to an embodiment.

As depicted in FIG. 4, inner face 210 of first portion 202 may be positioned directly adjacent to second face 220 of second portion. This may enable arm 110 to be a unified arm in the first mode. In embodiments, arm 110 may transition from the second mode to the first mode automatically if adjustable member 230 has a compressed resting state. This may cause adjustable member to automatically retract within a hollow chamber inside of arm 110, and allow female member 240 to receive male member 310. Alternatively, arm 110 may transition from the second mode to the first mode by a user performing actions to insert male member 310 into female member 240.

As further depicted in FIG. 4, there may be a space 410 between inner face 220 of second portion 204 and a sidewall of compressible member 120.

FIGS. 5-10 depict various views of glasses 100 in the first mode, according to an embodiment.

Figure 11:
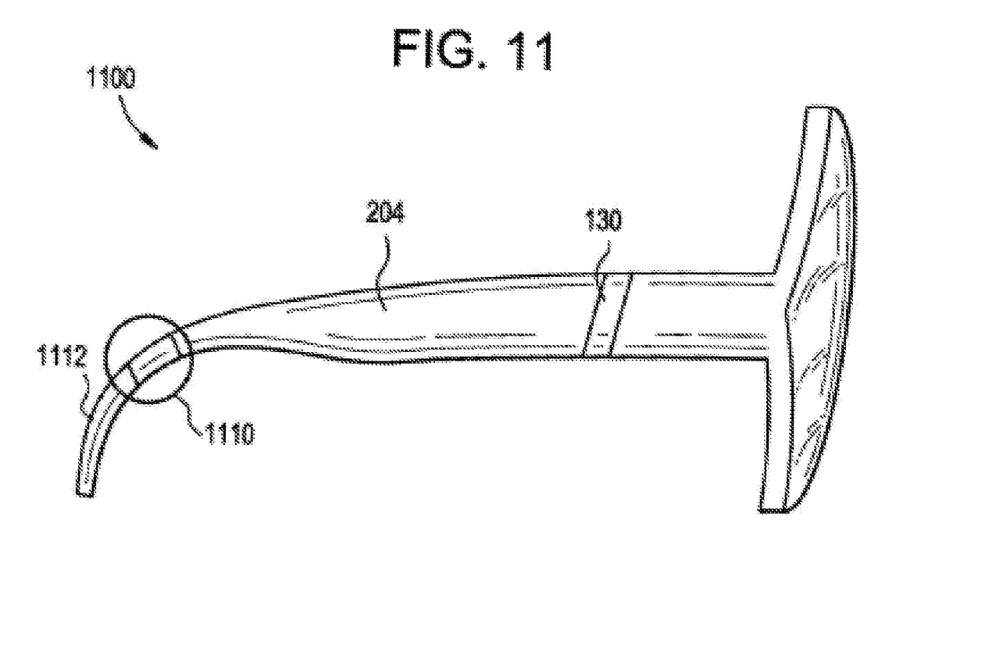
FIGS. 11 and 12 depict glasses, according to an embodiment.
Figure 12:
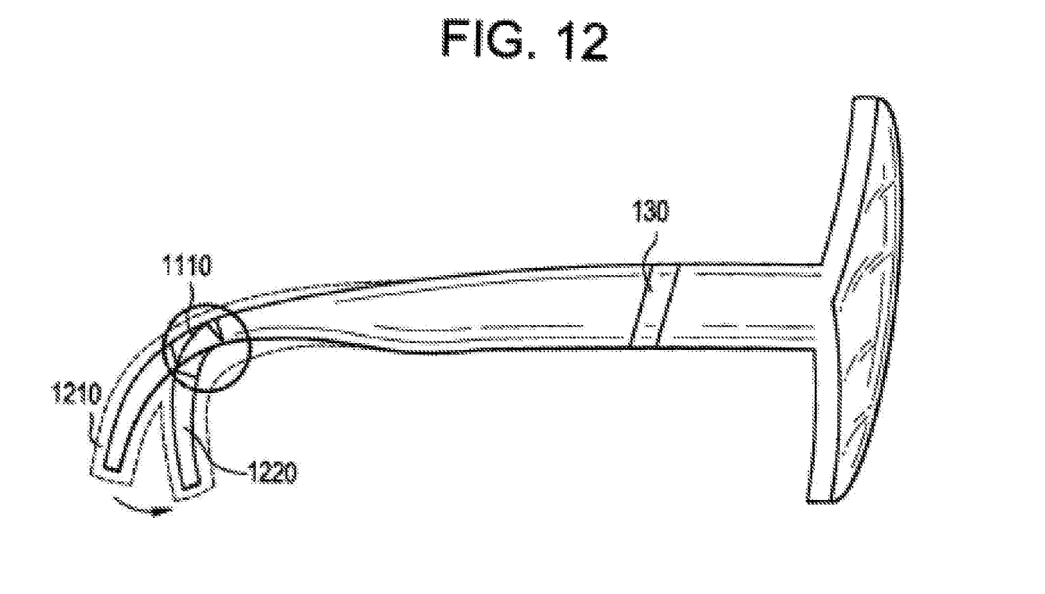

FIGS. 11 and 12 depict glasses 1100, according to an embodiment. Elements depicted in FIGS. 11 and 12 may be described above, and for the sake of brevity a further description of these elements is omitted.

As depicted in FIGS. 11 and 12, glasses 1100 may have a dynamic hinge 1110 positioned proximate to the temples of glasses 1100. Dynamic hinge 1110 may be positioned second portion 204 of glasses 1100, and may be formed of a different material than second portion 204 and the rest of the frame of glasses 1100. For example, dynamic hinge 1110 may be formed of a rubber, soft plastic, gel, etc. that is configured to retain an initial shape when no forces are applied to dynamic hinge 1110, and to flex when forced are applied to dynamic hinge 1110.

Dynamic hinge 1110 may be configured to allow a third portion 1112 of glasses 1100 to flex, bow, move, etc. with respect to second portion 204 responsive to dynamic 1110 receiving forces. This may enable third portion 1112 to be positioned at a resting position 1210 if no forces are applied to dynamic hinge 1110 and bend inward 1220 responsive to applied forces to dynamic hinge 1110. Responsive to removing the forces to dynamic hinge 1110, then dynamic hinge 1110 may revert back to its resting position.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

Reference throughout this specification to "one embodiment," "an embodiment" "one example," or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. An arm for glasses comprising:
a first portion of the arm;
a second portion of the arm, wherein the second portion includes a dynamic hinge, the dynamic hinge being positioned between a distal end of the second portion and a proximal end of the first portion;
a coupling mechanism configure to couple the first portion of the arm and the second portion of the arm, the coupling mechanism being positioned between the dynamic hinge and a lens of the glasses;
a retractable reel configured to change a distance between the first portion of the arm and the second portion of the arm, the retractable reel including a first end internally positioned within the first portion of the arm and a second end internally positioned within the second portion of the arm, the retractable reel including a tether that is configured to permanently couple the first portion and the second portion together, wherein in a first mode the first portion of the arm is positioned adjacent to the second portion of the arm, and in a second mode the first portion of the arm is positioned away from the second portion of the arm, wherein the retractable reel is configured to change between the first mode and the second mode responsive to applying forces against the second portion of the arm in a first direction to elongate an exposed portion of the tether, the first direction being away from the first portion of the arm, wherein responsive to removing the applied forces to the second portion of the arm in the first direction the retractable reel will automatically retract the tether to move the second portion of the arm in a second direction.

2. The arm of claim 1, wherein the tether is not exposed in the first mode.

3. The arm of claim 2, further comprising:
a first member positioned on a first inner end of the first portion of the arm;
a second member positioned on a second inner end of the second portion, wherein the first member is configured to be inserted into the second member in the first mode.

4. The arm of claim 3, wherein the coupling mechanism includes angled internal sidewalls to increase a surface area between the first member and the second member.

5. The arm of claim 4, wherein the first member has a first magnetic polarity, and the second member has a second magnetic polarity.

6. The arm of claim 1, wherein the second portion includes a dynamic hinge, the dynamic hinge being positioned between a distal end of the second portion and a proximal end of the first portion.

7. The arm of claim 1, wherein the dynamic hinge is comprised of a different material then the second portion of the arm.

8. The arm of claim 7, wherein the dynamic hinge is configured to move between a resting state and a flexed state.

9. The arm of claim 8, wherein the distal end rotates away from the proximal end in the flexed state responsive to forces being applied to the distal end.

10. The arm of claim 9, wherein the distal end automatically returns to the resting state responsive to the forces being removed.

11. The arm of claim 10, wherein the dynamic hinge is configured to move between the flexed state and the resting state independent from whether the coupling mechanism is in the first mode or the second mode.

* * * * *